3,079,411
PREPARATION OF LONG-CHAIN ALIPHATIC
PEROXY ACIDS
Leonard S. Silbert and Daniel Swern, Philadelphia, Pa., assignors to the United States of America as represented by the Secretary of Agriculture
No Drawing. Filed Apr. 24, 1961, Ser. No. 105,236
12 Claims. (Cl. 260—406)
(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This invention relates to a novel procedure of general application in the preparation of long-chain aliphatic peroxy acids.

Although approximately twenty methods and modifications thereof are available for peroxy acid synthesis, these methods, with possibly one exception, are not general, and only a few are of value as synthetic methods for obtaining high purity peroxy acids of specific types in good yields.

The most useful procedure for the direct preparation of long chain aliphatic monobasic and dibasic peroxy acids employs concentrated sulfuric acid as the reaction medium and catalyst with 50–65% hydrogen peroxide as the oxidation agent, as the equation shows in the preparation of monoperoxy acids:

$$RCO_2H + H_2O_2 \xrightarrow{H_2SO_4} RCO_3H + H_2O$$

This procedure, owing to solubility problems, is limited to monobasic acids up to about palmitic acid and dibasic acids up to about 1,10-decanedicarboxylic acid, and fails with certain aliphatic acids containing functional groups sensitive to sulfuric acid.

An object of the present invention is to provide a general procedure for the direct preparation of aliphatic peroxy acids. A further object is to provide a procedure for preparation of peroxy acids from substituted aliphatic acids, particularly in regard to substituents labile to the action of sulfuric acid. Other objects and a fuller understanding of the invention may be had by referring to the following description and claims.

It has been found that the use of an alkanesulfonic acid, such as methanesulfonic acid as a solvent and reaction medium for reacting hydrogen peroxide with an aliphatic carboxylic acid, results in substantially quantitative (usually 95 to 99%) conversion of the carboxylic acid to the corresponding peroxy acid and that products of high purity may be separated from the reaction mixture. Although the procedure of this invention is considered generally applicable to all aliphatic carboxylic acids, it is primarily directed to the preparation of peroxy acids of water-insoluble fatty acids containing 6 to 22 carbon atoms where simpler, currently available processes are inefficient or unsuccessful in operation.

Ethanesulfonic acid, or mixtures of methanesulfonic and ethanesulfonic or other alkanesulfonic acids, can also be used but offer no apparent advantage over methanesulfonic acid.

In general according to the present invention an aliphatic compound of a general formula (I) $\quad ROOC-(CH_2)_n-Y$ wherein R is H or a short carbon chain alkyl radical, Y is $CH_3$ or COOR, and $n$ is an integer from 4 to 20, inclusive, or (II) $\quad ROOC-(CHX)-(CH_2)_n-CH_3$ wherein R is H or a short carbon chain alkyl radical, X is F, Cl, or Br, and $n$ is an integer from 3 to 19, inclusive, or (III) $\quad ROOC-(CH_2)_m-(CHOH)-(CH_2)_n-H$ wherein R is H or a short carbon chain alkyl radical, $m$ is an integer from 4 to 20 inclusive, $n$ is an integer from 0 to 16, inclusive, and the sum of $m$ and $n$ is 4 to 20, in an alkanesulfonic acid such as methanesulfonic acid or ethanesulfonic acid and at a temperature in the range of about 10 to 60° C., is contacted with hydrogen peroxide, thus converting the aliphatic compound to an aliphatic peroxy acid, and the peroxy acid is separated from the reaction mixture.

In a preferred embodiment of the invention the aliphatic acid is combined with at least about a 3 to 1 mole ratio of methanesulfonic acid and then about a 50 to 200% molar excess of hydrogen peroxide, usually as about a 90 to 95% aqueous solution, although 70% hydrogen peroxide is satisfactory in some instances for providing good yields, is slowly added and mixed with the solution or slurry of the aliphatic acid while the mixture is maintained at temperatures in the range of about 30 to 60° C.

Various procedures may be used for separating and purifying the peroxy acid products. The peroxy acids are usually less soluble in the reaction mixture than the parent acid and this property may be utilized in separating them from the mixture. The peroxy acids may also be extracted from the reaction mixture with a suitable solvent, such as benzene or petroleum ether, which is not attacked by the peroxy acid. If desired, the extract may be washed with water to remove hydrogen peroxide and the alkanesulfonic acid and the extract containing the peroxy acid may be used in a subsequent reaction without separate isolation and purification of peroxy acid.

Analytically pure products are obtained by recrystallization of the peroxy acids from solvents such as chloroform, acetone and petroleum ether. Peroxy acid products are analyzed by an iodometric method, such as that described by D. H. Wheeler, Oil and Soap, vol. 9, page 89 (1932).

The amount of alkanesulfonic acid employed as the solvent or reaction medium is selected primarily with consideration of effect upon yield of the reaction, the higher ratios of methanesulfonic acid to aliphatic acid allowing more of the latter to be in solution, in addition to providing a better means of controlling the distribution of the hydrogen peroxide and of controlling the temperature of the mixture. In most instances the arbitrarily selected ratio of 5 moles of methanesulfonic acid to 1 mole of the aliphatic acid is adequate for excellent results. With aliphatic acids of low solubility, such as stearic acid, the mole ratio of methanesulfonic acid to carboxylic acid is usually increased to about 8 to 1.

While formation of peroxy acids may be carried out at temperatures as low as 10° C., the use of higher temperatures is preferrred. The increase in solubility of the aliphatic acid in methanesulfonic acid and increase in rate of reaction with increase in temperature usually results in excellent conversion to peroxy acid in one hour or less when operating at temperatures in the range of 30 to 60° C.

Although hydrogen peroxide solutions of lower concentration, for example a 50% aqueous solution, can be used in the present process, it is preferred that the solution have a concentration of about 70% or higher, as minimizing the water content in the reaction mixture drives the equilibrium of the reaction in the direction of conversion to peroxy acid and higher yields are thus obtained in shorter times. The commercial grade 98% hydrogen peroxide usually assayed 94–95% at the time of use in the examples cited.

A commercially available practical grade of methanesulfonic acid was satisfactory for use in the process.

The following examples further illustrate the practice of this invention.

EXAMPLE 1

Peroxylauric Acid

Three grams (0.015 mole) of lauric acid was combined with 7.2 g. (0.075 mole) of methanesulfonic acid in an open tall-form beaker and 1.3 g. (0.045 mole) of 94% hydrogen peroxide was added dropwise with stirring, maintaining the temperature of the mixture at 30–40° C. The hydrogen peroxide was added in a time interval of about 10 minutes and stirring was continued for 50 minutes. The mixture was cooled to 10–15° C., and crushed ice (10 g.) was added, followed by cautious addition of ice-cold water, maintaining the temperature below 25° C. The mixture was filtered on a Buchner funnel, the precipitate washed with cold water several times, and then dried over a desiccant. Peroxylauric acid of 99% purity was obtained in 97% yield. The peroxy acid was obtained in analytical purity by crystallization from petroleum ether (10 ml./g.) after dissolving the crude at 50° C., seeding the solution and cooling to 0° C. Pertinent data are summarized in Table I.

EXAMPLES 2 to 4

The peroxy acids listed in Table I under number 2 to 4 were prepared by a procedure similar to that described in Example 1 with the variations noted in ratios of components in the reaction mixture, temperature and time of reaction.

The results of Example 2 show that the process makes possible the direct preparation of peroxystearic acid in high yields and in high purity. Example 4 demonstrates the preparation of the peroxy acid of a compound in which a labile functional group such as hydroxyl is retained unchanged. While the hydroxyl function in the example is in the 12-position, the process is considered applicable to other hydroxylated aliphatic compounds, as depicted in general formula III, in which the hydroxyl function is at least 4 methylene groups removed from the carboxyl function.

EXAMPLE 5

α-Bromoperoxystearic Acid

α-Bromostearic acid, 5.4 g. (0.015 mole) and 7.2 g. (0.075 mole) of methanesulfonic acid were combined and 1.7 g. (0.045 mole) of 94% hydrogen peroxide was slowly added, maintaining a temperature of about 50° C. The procedure was similar to that of Example 1 except that after the addition of ice and water the peroxy acid product was separated by extraction of the aqueous mixture in a separatory funnel with olefin-free petroleum ether as the solvent. The petroleum ether layer was washed with saturated ammonium sulfate solution to insure complete removal of methanesulfonic acid and hydrogen peroxide, then with water, dried over anhydrous sodium sulfate, and filtered. Upon evaporation of the petroleum ether the product, α-bromoperoxystearic acid, a low melting solid, was obtained in 86% yield (Table I).

EXAMPLE 6

Preparation of α-Bromoperoxycapric Acid

A procedure similar to that of Example 5 was employed. Upon evaporation of the petroleum ether, the product, α-bromoperoxycapric acid was obtained as a liquid and was not further purified. Data of reaction time and temperature and yield are reported in Table I.

Although the particular examples illustrate the application of the process to bromine substituted aliphatic acids, the process is considered applicable to compounds in which the substituent halogen is fluorine or chlorine.

EXAMPLES 7 AND 8

These examples illustrate results when ethanesulfonic acid is used in place of methanesulfonic acid with stearic acid at a lower mole ratio than in Example 2 and when the temperature of the reaction mixture is maintained at either 30 or 40° C. The results indicate that reaction conditions similar to those of Example 2 will be necessary to obtain comparable yields, so there is no apparent advantage in using ethanesulfonic acid or other homologus alkanesulfonic acids as the solvent and reaction medium.

The foregoing examples are presented in illustration of, but are not intended to be in limitation of, the process of the present invention.

Alkyl esters of the aliphatic acids, particularly the esters in which the alkyl group contains one to four carbon atoms, are hydrolyzed in the reaction mixture so that the peroxy acid product is the same as that obtained when the starting compound is the free aliphatic acid. In general, the simple esters are more soluble in the reaction medium and their use may be of advantage in expediting the conversion of relatively insoluble acids to the peroxy acid product.

TABLE I.—REACTION CONDITIONS AND YIELDS OF ALIPHATIC PEROXY ACIDS

| Example No. | Peroxy Acid | Mole Ratio, MSA:H$_2$O$_2$:CA[a] | Temp., °C. | Time, hrs. | Peroxy Acid In Crude Product, percent | Yield [b] percent |
|---|---|---|---|---|---|---|
| 1 | Peroxylauric | 5:3:1 | 40 | 1 | 99 | 97 |
| 2 | Peroxystearic | 8:3:1 | 60 | 2 | 98 | 90 |
| 3 | Diperoxysebacic | 5:6:1 | 50 | 1 | 95 | 92 |
| 4 | 12-Hydroxyperoxystearic | 5:3:1 | 30 | 1 | 94 | 90 |
| 5 | α-Bromoperoxystearic | 5:3:1 | 50 | 1 | 95 | 86 |
| 6 | α-Bromoperoxycapric | 5:3:1 | 40 | 1 | 97 | 85 |
| 7 | Peroxystearic | 7[c]:3:1 | 30 | 3 | 50 | -------- |
| 8 | ----do-------- | 7[c]:3:1 | 40 | 2 | 72 | -------- |

[a] Abbreviations: MSA is methanesulfonic acid, and CA is carboxylic acid.
[b] Calculated by multiplying the purity of the crude product by the percentage yield.
[c] Ethanesulfonic acid.

We claim:
1. A process for the preparation of an aliphatic peroxy acid comprising contacting an aliphatic compound of a general formula selected from the group consisting of

$$ROOC-(CH_2)_n-Y$$

wherein R is selected from the group consisting of H and a short carbon chain alkyl radical, Y is selected from the group consisting of $CH_3$ and COOR, and $n$ is an integer from 4 to 20;

$$ROOC-(CHX)-(CH_2)_n-CH_3$$

where R is selected from the group consisting of H and a short carbon chain alkyl radical, X is selected from the group consisting of F, Cl, and Br, and $n$ is an integer from 3 to 19; and $$ROOC-(CH_2)_m-(CHOH)-(CH_2)_n-H$$

wherein R is selected from the group consisting of H and a short carbon chain alkyl radical, $m$ is an integer from 4 to 20, $n$ is an integer from 0 to 16, and the maximum sum of $m$ and $n$ is 20; in an alkanesulfonic acid selected from the group consisting of methane sulfonic acid, ethane sulfonic acid, and mixtures thereof at a temperature in the range of about from 10 to 60° C., with hydrogen peroxide, thus converting the aliphatic compound to an aliphatic peroxy acid, and separating the aliphatic peroxy acid from the reaction mixture.

2. The process of claim 1 in which the aliphatic compound is a member of the general formula $$ROOC-(CH_2)_n-Y$$

wherein R is selected from the group consisting of H and a short carbon chain alkyl radical, Y is $CH_3$ and $n$ is an integer from 4 to 20.

3. The process of claim 2 in which R is H and $n$ is 16.
4. The process of claim 2 in which R is H and $n$ is 10.
5. The process of claim 1 in which the aliphatic compound is a member of the general formula $$ROOC-(CH_2)_n-Y$$

wherein R is selected from the group consisting of H and a short carbon chain alkyl radical, Y is COOR, and $n$ is an integer from 4 to 20.

6. The process of claim 5 in which R is H and $n$ is 8.
7. The process of claim 1 in which the aliphatic compound is a member of the general formula $$ROOC-(CHX)-(CH_2)_n-CH_3$$

wherein R is selected from the group consisting of H and a short carbon chain alkyl radical, X is selected from the group consisting of F, Cl, and Br, and $n$ is an integer from 3 to 19.

8. The process of claim 7 in which R is H, X is Br, and $n$ is 15.
9. The process of claim 7 in which R is H, X is Br, and $n$ is 7.
10. The process of claim 1 in which the aliphatic compound is a member of the general formula $$ROOC-(CH_2)_m-(CHOH)-(CH_2)_n-H$$

where R is selected from the group consisting of H and a short carbon chain alkyl radical, $m$ is an integer from 4 to 20, $n$ is an integer from 0 to 16, and the maximum sum of $m$ and $n$ is 20.

11. The process of claim 10 in which R is H, $m$ is 10 and $n$ is 6.
12. 12-hydroxyperoxystearic acid.

References Cited in the file of this patent
UNITED STATES PATENTS

| | | |
|---|---|---|
| 1,754,914 | Stoddard | Apr. 15, 1930 |
| 1,854,764 | Rollhaus et al. | Apr. 19, 1932 |
| 2,301,124 | Kokatnur et al. | Nov. 3, 1942 |
| 2,806,045 | Gross | Sept. 10, 1957 |
| 2,813,885 | Swern et al. | Nov. 19, 1957 |

OTHER REFERENCES

Parker et al.: J. Am. Chem. Soc. 79, 1929–1931 (1957).

Merck Index, 1960 edition, page 275, published by Merck & Co., Rahway, N.J.